Patented Aug. 22, 1933

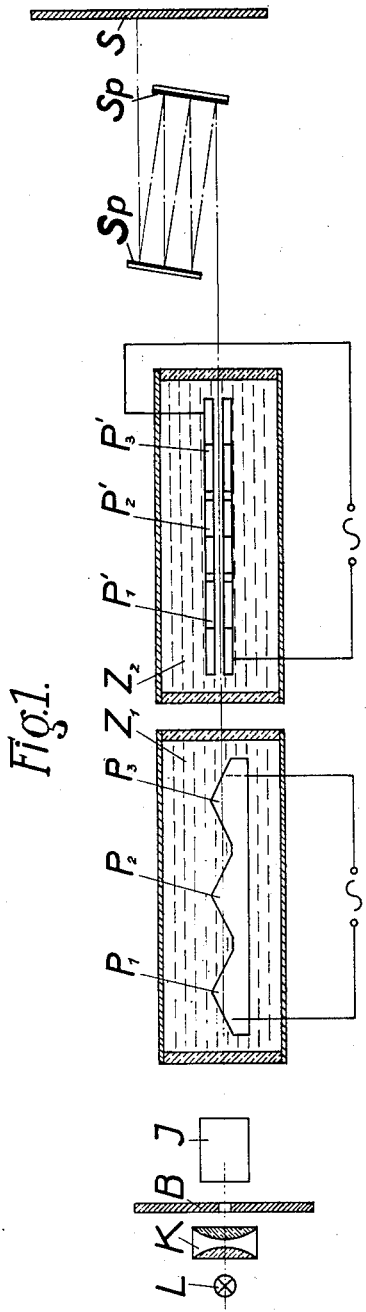
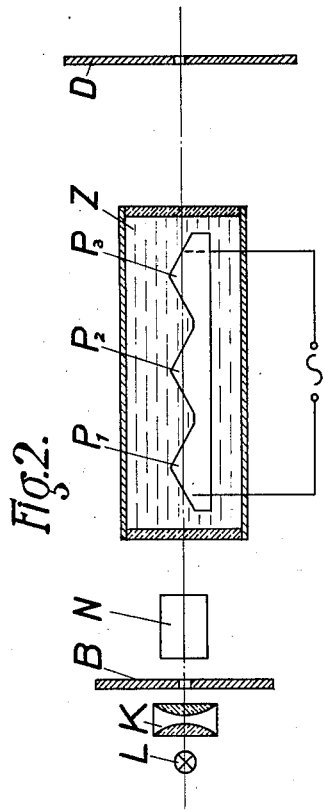

1,923,891

UNITED STATES PATENT OFFICE 1,923,891

APPARATUS FOR REFRACTING LIGHT RAYS

Franz Skaupy, Berlin, Germany

Application June 16, 1930, Serial No. 461,574, and in Germany June 19, 1929

7 Claims. (Cl. 178—6)

This invention relates to optical devices for producing varying deflections of light rays for use in television, picture telegraphy or the like. For these purposes it is necessary to cause a beam of light to scan a picture, at the transmitting end, or to cause a beam of light of varying intensity to travel similarly at the receiving end to reconstruct a picture. These travelling beams of light are frequently produced by means of moving mirrors; but it has been proposed to produce them by the use of refracting bodies to which electrical potentials are applied which cause them to become doubly refracting, the application of such potentials causing an alteration in the direction of travel of a ray passing through the prism. This arrangement suffers from the disadvantage that the changes in the direction of the light ray, which are thus produced, are small, and the object of the invention is to provide means by which larger deviations can be produced.

For this purpose, in accordance with the present invention, in an optical device for producing varying deflections of light rays, device for use in television, picture telegraphy or the like, in which the direction of light rays is changed during their passage through one or more prisms of an electrically double-refracting substance, the said prism or prisms is or are situated in a medium having a refractive index differing but little from that of the prism and having bounding surfaces which preferably are not parallel to the refracting surfaces of the prism.

The case is particularly favourable when this surrounding medium is identical with the electrically double-refracting medium forming the prism. Then the index of refraction is the same inside and outside the prism, so long as the prism is not electrically excited; otherwise expressed, the index of refraction of the prism in relation to the surrounding medium is equal to unity and only becomes different from unity by electrical excitation. It will be seen by calculation that the deflections produced by the electrical excitation of the prism are especially great when the light ray enters the prism at a large angle of incidence, or when the refracting angle of the prism, supposing a symmetrical passage of the ray, is a large one, e. g. 120°, a condition which is rendered possible through the proximity of the indices of refraction of prism and surrounding medium. The relationships here are similar to those in the case of direct-vision prisms, in which the real dispersion prism is so enclosed between two prisms of similar indices of refraction, that the light ray passes through the system almost in a straight line, in which the dispersion-prism can also be given a very large refraction angle and thereby attain a high dispersion. In apparatus in accordance with the invention, just in direct-vision prisms, there is approximately grazing incidence and grazing emergence of the light ray, in the first case at the electrically energized prism, and the second case at dispersion prism.

The invention will now be described by way of example with reference to the accompanying drawing in which Figure 1 shows an apparatus for deflecting light rays to give a scanning action over a plane surface, and Figure 2 shows an apparatus which may be used to modulate the quantity of light in a beam passing through an aperture.

In an oblong vessel $Z_1$, closed at the short ends by plane glass plates and filled with nitrobenzine, are several pairs of condenser plates $P_1$, $P_2$, $P_3$. Each pair of plates forms, with the liquid there between, a deflecting prism. The section of the prism is given by the shape of the condenser plates. The liquid outside these condensers forms the surrounding medium in the sense described above. The light ray falling perpendicularly on the closure plates of the vessel, passes through all the deflecting prisms and is deflected from its direction upon the electrical excitation of the prisms, whereby the whole deflection given is the sum of the three similar deflections in the individual prisms. The deflection varies in accordance with the value of the electrical potential which is applied simultaneously to all the liquid prisms, and, if an alternating potential is applied, allows a strip of light to shine on a screen placed behind the apparatus. If a patch on the screen (and not merely a strip) is to be scanned by the light, then a second similar device ($Z_2$) must be arranged behind the first, the electrical axis of the deflection prism which is at right angles to that of the first device.

Figure 1 shows diagrammatically the entire arrangement which is necessary in the case of picture transmission for the reconstruction of a picture from points of differing intensity; L signifies a source of light, K a condenser, J a device for varying the intensity of the light rays according to the applied potential, B a screen, $Z_1$ and $Z_2$ the two deflection devices which are arranged at 90° to one another, $Sp$ denotes an arrangement of two mirrors, parallel to one another, between which the light ray passes to and fro several times in order to lengthen its path with a view to increasing the linear deflection, S the screen on which the picture produced is received. The device J may be one of the Telefunken-Karolus cells in use at the present time, but a deflection prism in accordance with the invention also serves for this purpose, provided it is used as shown in Figure 2. In this case the light ray from which one component of vibration has been removed by means of the polarizer N, after passing through a deflection prism or cell Z in accordance with the invention, falls on a screen D which, according to the state of excitation of the deflection prism, allows differing parts of the cross-section of the light ray, and consequently different intensities, to pass through. The light ray of fluctuating intensity proceeding from this screen is then conducted, for the purpose of correct distribution of the picture elements on the screen, through the deflecting devices of Figure 1.

The regulation of the two cells $Z_1$ and $Z_2$ at the receiver may be effected either by wireless control from the transmitter, or better by two independent alternating current generators of different frequencies at the receiver, so that the picture is suitably scanned. The synchronism with the device at the transmitting station scanning the picture can be effected by connecting the generators to the synchronous alternating current lighting network covering the country, in case of necessity with the assistance of known control devices in the circuits of the generators.

Having now particularly described and ascertained the nature of my said invention and in what manner the same is to be performed, I declare that what I claim is:

1. An optical device for producing varying deflections of light rays, comprising a pair of electrodes, said electrodes having a triangular form and arranged side by side on opposite sides of the optical axis with the edges of the triangles at an angle thereto, an electrically, doubly refracting medium between said electrodes and means for applying an electric voltage to said electrodes.

2. An optical device for producing varying deflections of light rays, comprising a pair of electrodes, said electrodes having a triangular form and arranged side by side on opposite sides of the optical axis with the edges of the triangles at an angle thereto, an electrically, doubly refracting medium between said electrodes, means for applying an electric voltage to said electrodes and a medium surrounding said electrodes and having a refraction index differing but little from that of the medium arranged between said electrodes.

3. An optical device for producing varying deflections of light, comprising a pair of electrodes, said electrodes having triangular teeth and arranged side by side on opposite sides of the optical axis with the edges of the teeth at an angle thereto, an electrically doubly-refracting medium surrounding said electrodes and means for applying an electric voltage to said electrodes.

4. An optical device for producing varying deflections of light rays, comprising a pair of electrodes, said electrodes having triangular teeth and arranged side by side on opposite sides of the optical axis with the edges of the teeth at an angle thereto, nitro-benzine surrounding said electrodes and means for applying an electric voltage to said electrodes.

5. A television device comprising an optical device for producing varying deflections of light rays, comprising a pair of electrodes, said electrodes having triangular teeth and arranged side by side on opposite sides of the optical axis with the edges of the teeth at an angle thereto, an electrically doubly-refracting medium surrounding said electrodes and means for applying an electric voltage to said electrodes, a second optical device of the kind described, normally arranged to said optical device, a condensor projecting a light ray perpendicularly on to the closure plates of said first device and a screen arranged normally thereto behind said second optical device.

6. An optical device for producing varying deflections of light rays, comprising a pair of electrodes arranged side by side on opposite sides of the optical axis, said electrodes having end surfaces inclined at an angle to the optical axis, an electrically doubly refracting medium between said electrodes, and means for applying an electric voltage to said electrodes.

7. An optical device for producing varying deflections of light rays, comprising a pair of electrodes arranged side by side on opposite sides of the optical axis, said electrodes having corresponding edges inclined at an angle to each other and with respect to the optical axis, an electrically doubly refracting medium between said electrodes, and means for applying electric voltage to said electrodes.

FRANZ SKAUPY.